United States Patent
Casebolt et al.

(10) Patent No.: US 7,843,897 B2
(45) Date of Patent: Nov. 30, 2010

(54) SYSTEM, APPARATUS AND METHOD FOR MIXED MODE COMMUNICATION ON A SINGLE NETWORK

(75) Inventors: David J. Casebolt, Moscow, ID (US); Peter S. LaDow, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 697 days.

(21) Appl. No.: 11/554,499

(22) Filed: Oct. 30, 2006

(65) Prior Publication Data

US 2008/0101251 A1    May 1, 2008

(51) Int. Cl.
H04L 1/00    (2006.01)
H04L 12/26    (2006.01)
G06F 11/00    (2006.01)
H04L 12/28    (2006.01)
H04J 3/16    (2006.01)
H04J 3/22    (2006.01)
G05B 15/02    (2006.01)
G06F 19/00    (2006.01)

(52) U.S. Cl. ............... 370/351; 370/230; 370/252; 370/466; 700/9; 700/169

(58) Field of Classification Search ............... 370/230, 370/235, 401, 466; 709/224, 228
See application file for complete search history.

(56) References Cited

U.S. PATENT DOCUMENTS

| | | | | |
|---|---|---|---|---|
| 5,289,468 | A * | 2/1994 | Yoshida | 370/401 |
| 6,259,706 | B1 * | 7/2001 | Shimada | 370/466 |
| 6,542,464 | B1 * | 4/2003 | Takeda et al. | 370/230 |
| 7,304,586 | B2 * | 12/2007 | Wang et al. | 340/870.02 |
| 7,460,536 | B1 * | 12/2008 | Williams et al. | 370/392 |
| 7,599,748 | B2 * | 10/2009 | Dove et al. | 700/17 |
| 2003/0147420 | A1 | 8/2003 | Beckwith | |
| 2004/0028033 | A1 * | 2/2004 | Koistinen et al. | 370/352 |
| 2004/0073788 | A1 | 4/2004 | Kim | |
| 2004/0138786 | A1 * | 7/2004 | Blackett et al. | 700/295 |
| 2006/0077999 | A1 * | 4/2006 | Kagan et al. | 370/466 |
| 2006/0083260 | A1 * | 4/2006 | Wang et al. | 370/463 |
| 2006/0140146 | A1 * | 6/2006 | Funk et al. | 370/329 |
| 2006/0170409 | A1 * | 8/2006 | Kagan et al. | 324/74 |
| 2006/0238932 | A1 * | 10/2006 | Westbrock et al. | 361/42 |
| 2009/0265124 | A1 * | 10/2009 | Kagan | 702/62 |
| 2010/0002879 | A1 * | 1/2010 | Risley | 380/255 |
| 2010/0046545 | A1 * | 2/2010 | Kagan et al. | 370/466 |

OTHER PUBLICATIONS

EtherPoll—Jan. 27, 2004.*
John A. Kinast, AGA 12 part 2 draft, American Gas Association, Jan. 23, 2006.

* cited by examiner

*Primary Examiner*—Jayanti K Patel
*Assistant Examiner*—Christopher T Wyllie
(74) *Attorney, Agent, or Firm*—Eugene M. Cummings, P.C.

(57) ABSTRACT

Provided is a system, apparatus, and method for evaluating a variety of protocols on a computer network which includes a plurality of network devices. The network devices are adapted to communicate messages on the computer network using their respective protocols. The present invention system, apparatus and method are associated with one of the network devices. The present invention system, apparatus and method are further adapted to identify the various protocols on the network and analyze each message on the network to determine the protocol associated with the message. In another aspect of the present invention, the system and apparatus are adapted to determine whether to communicate a message to the associated network device based on this identification and analysis the message. The present invention embodiments allow for mixed mode communication on a single network.

30 Claims, 6 Drawing Sheets

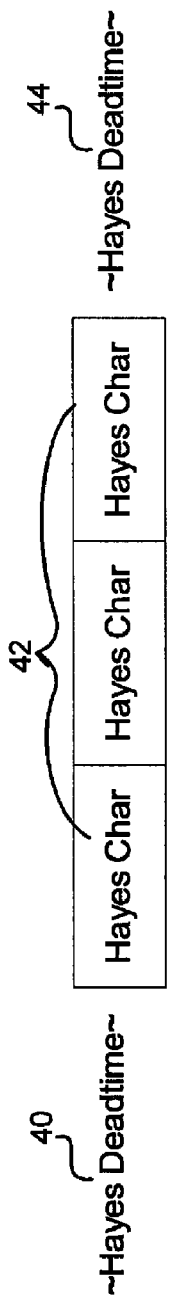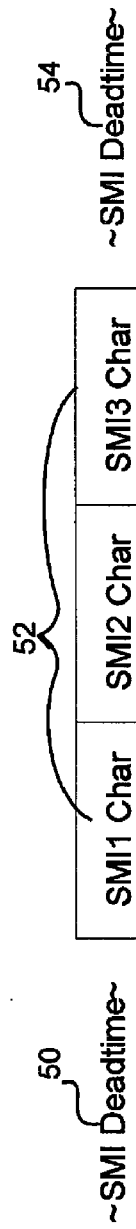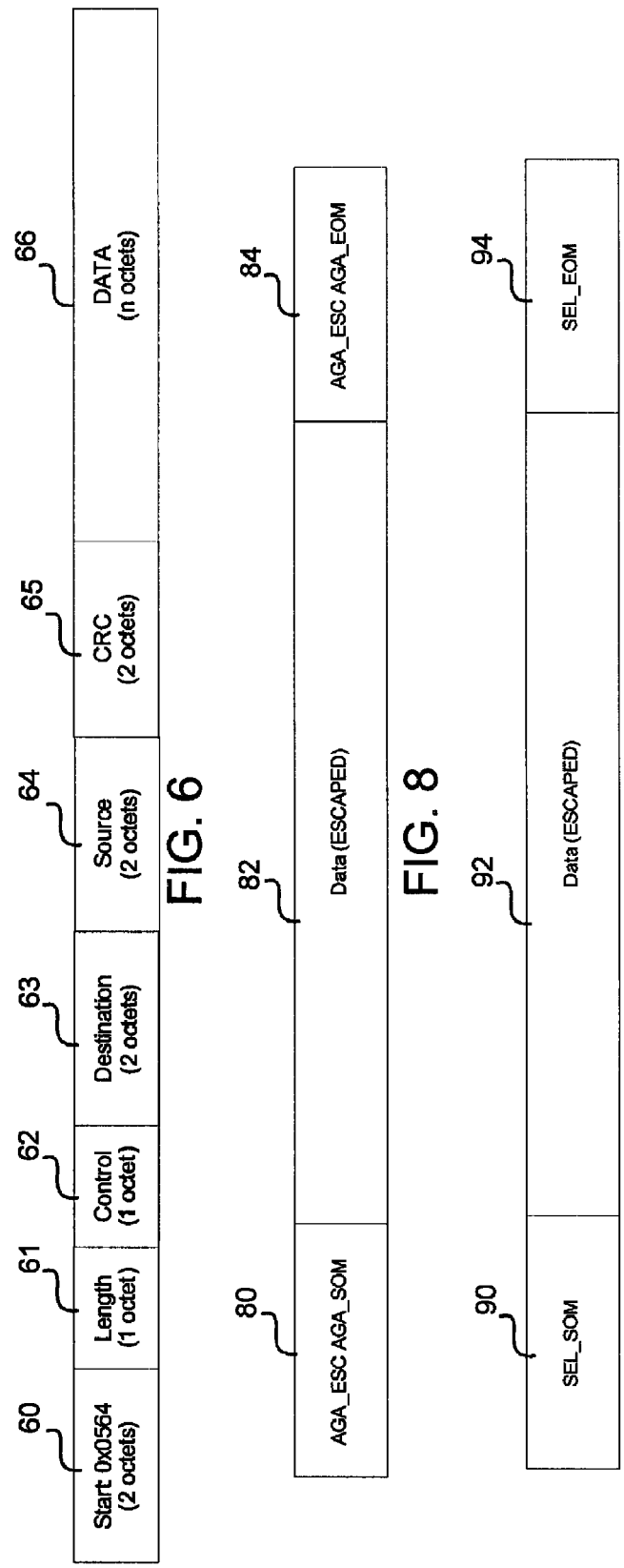

SYSTEM, APPARATUS AND METHOD FOR MIXED MODE COMMUNICATION ON A SINGLE NETWORK

CROSS-REFERENCE TO RELATED APPLICATIONS

None.

BACKGROUND OF THE INVENTION

The present invention relates to a system, apparatus and method for evaluating a variety of protocols on a computer network which includes a plurality of network devices. The network devices are adapted to communicate messages on the computer network using their respective protocols. The present invention system, apparatus and method are associated with one of the network devices. The present invention system, apparatus and method are further adapted to identify the various protocols on the network and analyze each message on the network to determine the protocol associated with the message. Such an arrangement allows for a mixed mode communication on a single network.

The present invention system, apparatus and method may be used with a device associated with any type of computer network. Suitable computer networks may include local area networks (LANs), wide area networks (WANs), or any other computer networks which include a plurality of network devices which send messages therebetween using various protocols.

An example of a computer network is a Supervisory Control and Data Acquisition (SCADA) system. A SCADA system is typically a large-scale, distributed measurement and control computer network which includes a plurality of network devices which communicate using various protocols. The network devices of a typical SCADA system generally comprise a SCADA server for monitoring, controlling or automating one or more remotely connected Intelligent Electronic Devices (IEDs).

In one application, a SCADA system may be used in the monitoring, controlling and/or automation of an electric power system. Accordingly, a SCADA server may be used to monitor, control and/or automate IEDs such as electric power system protective devices, protective relays, remote terminal units (RTUs), power line communication devices, bay controllers, meters, and any other comparable devices. For example, a SCADA server may be adapted to control an IED to isolate some power system element(s) from the remainder of the power system upon detection of an abnormal condition or a fault in, or related to, the power system element(s).

In a typical SCADA system, the network devices associated therewith use various protocols which are often governed by protocol standards (e.g., MODBUS or DNP). Protocol standards govern how data is to be organized in a message such that the network devices are able communicate with one another. Because of these standards and for sake of ease, it has traditionally been preferable for SCADA systems to be configured such that all network devices communicate using the same protocol. For simple applications, the configuration of such systems is relatively easy as the SCADA server is merely required to communicate with one type of IED to perform a particular function.

In contrast, for complex applications such as networking of devices for an electric power system, it is preferable to configure a SCADA server for communication with many types of IEDs for the complete automation, controlling and/or monitoring of the system. These different IEDs in a SCADA system for an electrical power system are often multi-functional and, therefore, generally communicate using many different protocols. In traditional arrangements, the SCADA system is configured such that each protocol is transferred using separate communications lines, thereby forming multiple computer networks. This arrangement is particularly cumbersome and requires time- and labor-intensive configuration of the SCADA server and/or IEDs during installation. Therefore, it is an object of the present invention to provide a system and method for providing mixed-mode communication on a single network.

In another application, it is often preferable for the computer network to be encrypted for security purposes. However, it is often desirable to encrypt messages associated with some network devices and not others. Therefore, in such networks, it is often desirable to couple network devices using encrypted communication together, creating an encrypted network. Likewise, it is often desirable to couple network devices using non-encrypted communication together, creating a non-encrypted network. This arrangement is also particularly cumbersome and requires time and labor intensive configuration of the devices during installation.

Accordingly, it is an object of this invention to provide a system and apparatus that evaluates a variety of protocols on a computer network which comprises a plurality of devices that communicate using various protocols. It is further an object of the present invention to provide a system and apparatus which identifies the various protocols on the network and analyzes each message on the network to determine the protocol associated with the message. This arrangement allows all network devices, although adapted to communicate using different protocols, to reside on a single network or even on a single communications line. Such an arrangement allows for a mixed-mode communication on a single network or a single communications line.

These and other desired benefits of the preferred embodiments, including combinations of features thereof, of the invention will become apparent from the following description. It will be understood, however, that a process or arrangement could still appropriate the claimed invention without accomplishing each and every one of these desired benefits, including those gleaned from the following description. The appended claims, not these desired benefits, define the subject matter of the invention. Any and all benefits are derived from the multiple embodiments of the invention, not necessarily the invention in general.

SUMMARY OF THE INVENTION

In accordance with the invention provided is a system, apparatus and method for evaluating a variety of protocols on a computer network which includes a plurality of network devices. The network devices are adapted to communicate messages on the computer network using their respective protocols. The present invention system, apparatus and method are associated with one of the network devices. The present invention system, apparatus and method are further adapted to identify the various protocols on the network and analyze each message on the network to determine the protocol associated with the message. Such an arrangement allows for a mixed mode communication on a single network.

In one embodiment, provided is a system for evaluating a message on a single network. The network includes a plurality of network devices communicating messages using various different protocols, wherein a portion of each message includes a specific sequence. The system generally comprises a protocol evaluation apparatus which includes a first protocol identifier module associated with a specific messaging protocol and a second protocol identifier module associated with another specific messaging protocol. The first protocol identifier module is adapted to evaluate a sequence of a portion of a message on the network. If the sequence of the portion of the message on the network is not in accordance with the specific messaging protocol of the first protocol identifier module, the second protocol identifier module evaluates the portion of the message. The present invention system further includes a network device coupled to the apparatus. The protocol evaluation apparatus is adapted to transmit the message to the network device if the sequence of a portion of the message is in accordance with the specific messaging protocol associated with either the first or second protocol identifier module.

In another embodiment, an apparatus for evaluating a message on a single network is provided. The network in this embodiment also includes a plurality of devices communicating messages using various different protocols, wherein a portion of each message includes a specific sequence. The present invention apparatus is associated with one of the network devices and generally includes a plurality of protocol identifier modules. One of the protocol identifier modules is associated with a specific messaging protocol and is adapted to evaluate a sequence of a portion of a message on the network. A second protocol identifier module is associated with another specific messaging protocol. If the sequence of the portion of the message on the network is not in accordance with the specific messaging protocol of the first protocol identifier module, the second protocol identifier module evaluates the portion of the message.

In yet another embodiment, a method for evaluating a message on a single network is provided. This network also includes a plurality of devices communicating messages using various different protocols, wherein a portion of each message includes a specific sequence. The method generally includes the steps of evaluating a sequence of a portion of a message on the network to determine whether the portion of the message is in accordance with a sequence of a specific messaging protocol. If the sequence of the portion of the message on the network is not in accordance with the specific messaging protocol, the portion of the message is evaluated to determine whether the portion of the message is associated with a sequence of another specific messaging protocol.

It should be understood that the present invention includes a number of different aspects or features which may have utility alone and/or in combination with other aspects or features. Accordingly, this summary is not exhaustive identification of each such aspect or feature that is now or may hereafter be claimed, but represents an overview of certain aspects of the present invention to assist in understanding the more detailed description that follows. The scope of the invention is not limited to the specific embodiments described below, but is set forth in the claims now or hereafter filed.

BRIEF DESCRIPTION OF THE DRAWINGS

FIG. 4 is a block diagram illustrating the sequence of a HAYES messaging protocol.

FIG. 5 is a block diagram illustrating the sequence of an SMI messaging protocol.

FIG. 6 is a block diagram illustrating the sequence of a DNP messaging protocol.

FIG. 8 is a block diagram illustrating the sequence of an AGA messaging protocol.

FIG. 9 is a block diagram illustrating the sequence of an SEL messaging protocol.

DETAILED DESCRIPTION OF THE INVENTION

The present invention relates to a system and apparatus for evaluating a variety of protocols on a computer network which includes a plurality of network devices. The network devices are adapted to communicate messages on the computer network using their respective protocols. The present invention system, apparatus and method are associated with one of the network devices. The present invention system, apparatus and method are further adapted to identify the various protocols on the network and analyze each message on the network to determine the protocol associated with the message. Such an arrangement allows for a mixed-mode communication on a single network.

Although various embodiments herein describe a system and apparatus associated with a network device in a SCADA system, it is contemplated that the present invention system, apparatus and method may be used with a device associated with any type of computer network. Suitable computer networks may include local area networks (LANs), wide area networks (WANs) or any other computer networks which include a plurality of network devices which send messages therebetween using various protocols.

Figure 1:
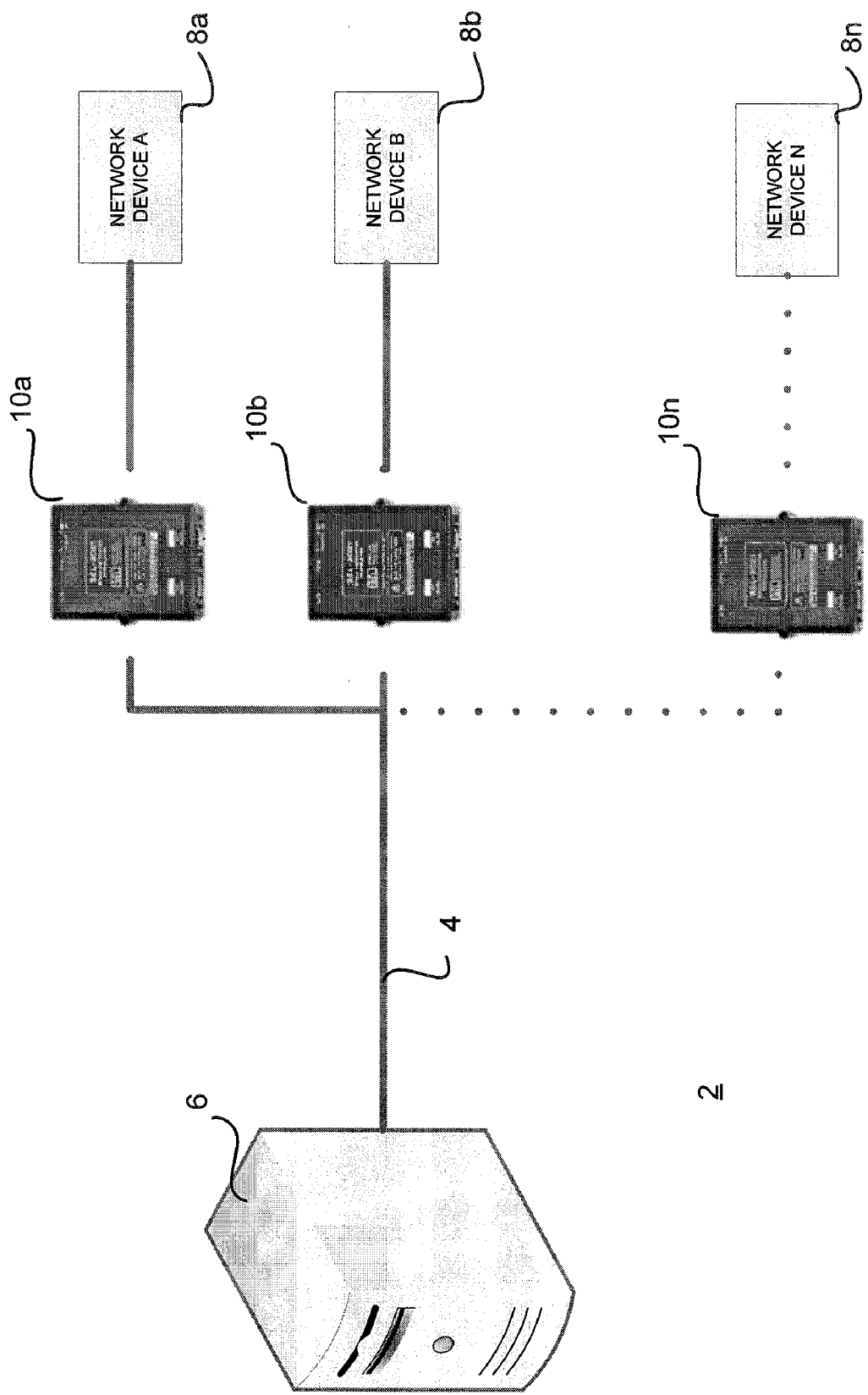
FIG. 1 is a single line schematic diagram of an embodiment of the present invention system for providing a mixed mode communication on a single network.

FIG. 1 is a block diagram of a SCADA system 2 in accordance with an aspect of the present invention including a system and device for evaluating a variety of protocols on the network 4. Such an arrangement allows for a mixed mode communication on a single network. The SCADA system 2 generally comprises a plurality of network devices. The network devices as shown in FIG. 1 include a SCADA server 6 for monitoring, controlling or automating remotely connected IEDs 8a, 8b . . . 8n. SCADA server 6 is adapted to communicate messages using various protocols to IEDs 8a, 8b . . . 8n.

In one embodiment, SCADA system 2 may be used in the monitoring, controlling and/or automation of an electric power system. Accordingly, IEDs 8a, 8b . . . 8n may be any one of the following: electric power system protective device, protective relay, remote terminal unit (RTU), power line communication device, bay controller, meter, or any other comparable device. As such, in this application, SCADA server 6 may be used to monitor, control and/or automate any one of the IEDs 8a, 8b . . . 8n to affect a power system element. For example, SCADA server 6 may be used to control any one of IEDs 8a, 8b or 8n to isolate some power system element(s) from the remainder of the power system upon detection of an abnormal condition or a fault in, or related to, the power system element(s).

This present invention SCADA system 2 is generally different from a traditional SCADA system in that it additionally includes protocol evaluation apparatuses 10a, 10b . . . 10n, which are generally adapted to identify the various protocols on the network 4 and analyze each message on the network 4 to determine the protocol associated with the message. Although they are shown as being separate and apart from the associated IEDs, protocol evaluation apparatuses 10a, 10b . . . 10n may also be implemented within or as a part of each respective IED. A protocol evaluation apparatus (not shown) may also be associated with, or part of SCADA server 6 for evaluation of messaging protocol being communicated thereto. The protocol evaluation apparatus allows for a mixed-mode communication on the single network.

Figure 2:
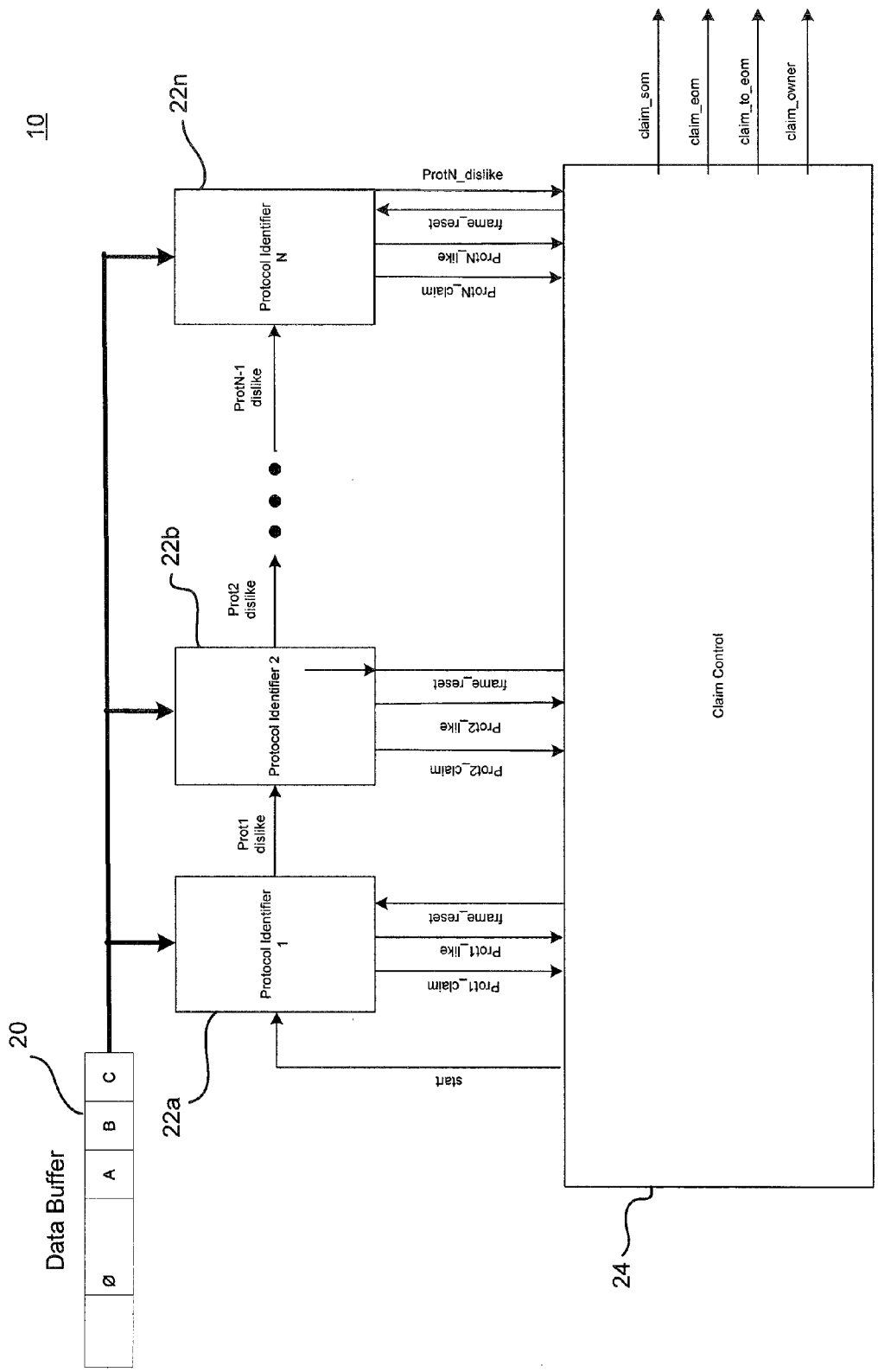
FIG. 2 is a functional block diagram of a protocol evaluation apparatus of FIG. 1 according to an embodiment of the present invention system.
Figure 3:
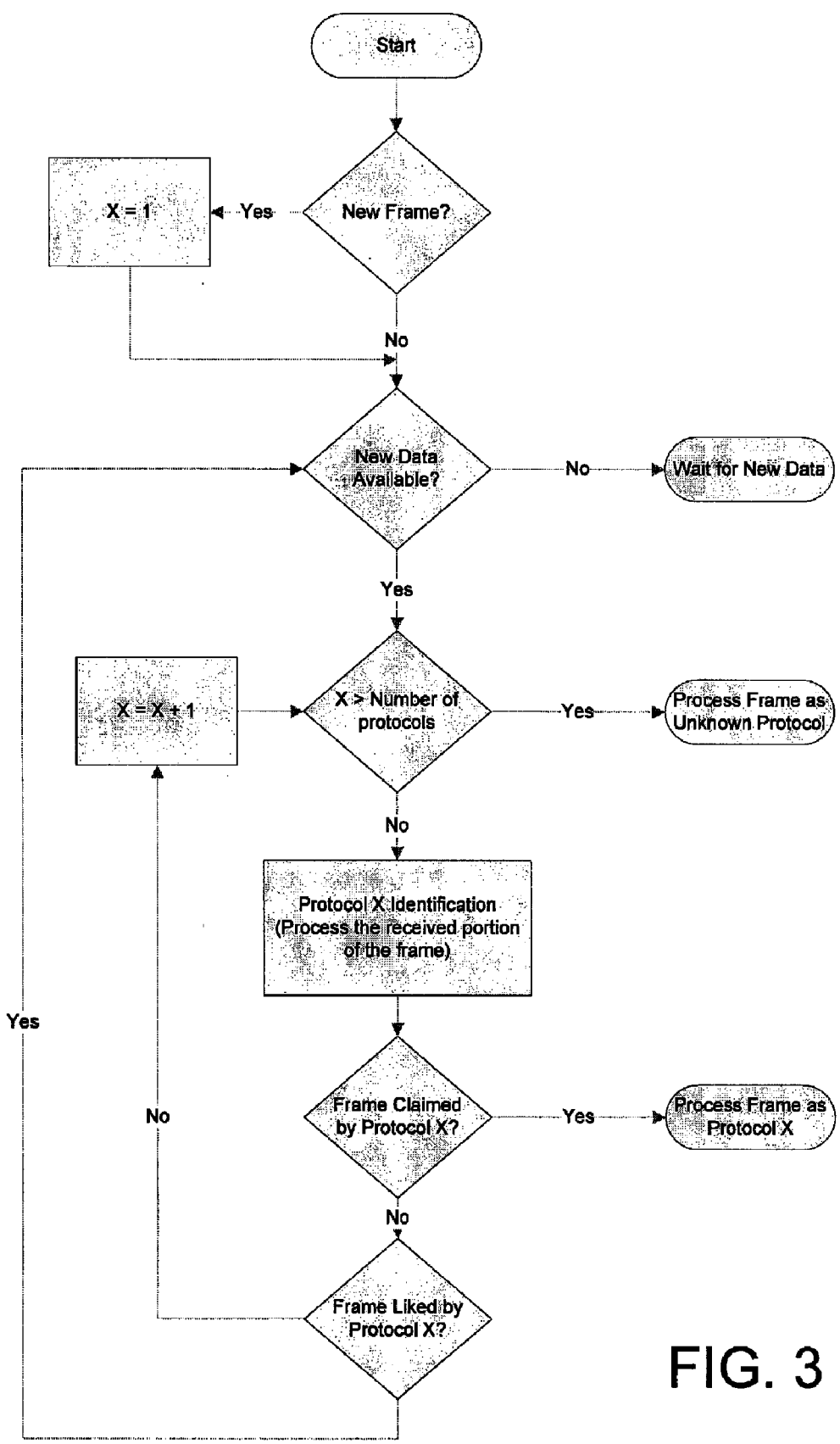
FIG. 3 is a flow chart illustrating the process for evaluating a messaging protocol according to an embodiment of the present invention.

FIG. 2 is a functional block diagram of any one of the protocol evaluation apparatuses 10a, 10b . . . 10n of FIG. 1. FIG. 3 is a flow chart illustrating the protocol evaluation process. Referring to both FIGS. 2 and 3 concurrently, various protocol messages are being communicated to an associated IED. The protocol evaluation apparatus 10 associated with the IED generally evaluates a selected portion of a message on the network. In one embodiment, each message may be subdivided into select portions and stored in an optional data buffer 20. In one embodiment, each message may be subdivided into frames, wherein the protocol evaluation apparatus 10 is adapted to evaluate the message on a frame-by frame basis or otherwise adapted to evaluate select frames of the message. In another embodiment, each message may be subdivided into to octets of data, wherein the protocol evaluation apparatus 10 is adapted to evaluate the octets of data or select octets of data. Optional data buffer 20 may be adapted to store a selected amount of data. For example, the data buffer 20 may be adapted to store a select number of frames or select number of octets of data. Other storage means may be used instead of data buffer 20.

Referring back to FIGS. 1 and 2, protocol evaluation apparatus 10 generally includes protocol identifier modules 22a, 22b . . . 22n. The data stored in the data buffer 20 is generally accessible to each of protocol identifier modules 22a, 22b . . . 22n. Protocol identifier modules 22a, 22b . . . 22n generally identify the protocol of the data associated with the message.

More specifically, in one embodiment, the first protocol identifier module 22a may be used to identify whether the message is in accordance with a first selected protocol message (e.g., a DNP protocol). A second protocol identifier 22b may be used to identify whether the message is in accordance with a second selected protocol message (e.g., MODBUS protocol). An 'N'th protocol identifier 22n may be used to identify whether the message is in accordance with 'N'th protocol message (e.g., a manufacturer specific protocol). For these embodiments, the messaging protocol may be in accordance with a specific protocol, a protocol standard, an encryption method, a timing element or any combination thereof.

In one example, in the identification process, the first protocol identifier module 22a may evaluate a select portion of a particular message. If the portion is in accordance with the first selected protocol, but does not contain enough information to uniquely identify the protocol, the first protocol identifier module 22a is configured to assert a "like". The first protocol identifier module 22a then evaluates other select portions of the message. If the select portions are in accordance with the first selected protocol, the first protocol identifier module 22a is configured to continue to assert "like" for those select portions. Once enough portions of the message are received to identify the protocol of the message, the first protocol identifier will assert "claim". At this point, the protocol of the message is identified.

If any of the portions of the message are not in accordance with the first selected protocol, the first protocol identifier module 22a asserts a "dislike". In this case, first protocol identifier module 22a is adapted to signal the second protocol identifier module 22b to evaluate the message. In this manner, the second protocol identifier module 22b begins a process similar to that of first protocol identifier module 22a.

More specifically, if the select portion of the message (which has already been evaluated by the first protocol identifier 22a) is in accordance with the second selected protocol, the second protocol identifier module 22b is configured to assert a "like". If the portion is in accordance with the second selected protocol, but does not contain enough information to uniquely identify the protocol, the second protocol identifier module 22b is configured to assert a "like". The second protocol identifier module 22b then evaluates other select portions of the message. If the select portions are in accordance with the second selected protocol, the second protocol identifier module 22b is configured to continue to assert "like" for those select portions. Once enough portions of the message are received to identify the protocol of the message, the second protocol identifier will assert "claim". At this point, the protocol of the message is identified.

If any of the portions of the message are not in accordance with the second selected protocol, the second protocol identifier module 22b asserts a "dislike". In this case, second protocol identifier module 22b is adapted to signal the next protocol identifier module to evaluate the message. In this manner, the next protocol identifier module begins a process similar to that of first and second protocol identifier modules 22a, 22b.

In one embodiment, the protocol identifier modules 22a, 22b . . . 22n may be arranged in the order of protocol identification priority. For example, the first protocol identifier module 22a may be associated with the messaging protocol having the highest priority, whereas the 'N' th protocol identifier module may be associated with the messaging protocol having the lowest priority.

In yet another embodiment, it is preferable that the protocol identifier modules 22a, 22b . . . 22n be arranged in order of complexity. In this arrangement, the first protocol identifier modules are associated with more complex protocols, whereas the latter protocol identifier modules are associated with simpler protocols. More specifically, some protocols include the same data portions as other protocols. In many of these instances, the beginning data portions of the more complex protocols are the same or similar to simpler protocols.

For example, a DNP message frame begins with (0x0564). A message frame from a separate protocol (PROTX) begins with (0x05). Therefore, if the first protocol identifier module were associated with PROTX protocol and the second protocol identifier module were associated with a DNP protocol, an error may occur. More specifically, if (0x05) is received, the first protocol identifier module would "claim" the message even if the second character received is (0x64). Therefore, it would be preferable to associate the more complex DNP protocol with the first protocol identifier and the simpler PROTX protocol with the second protocol identifier.

In yet another embodiment, each message may further be time-stamped based on a timer (not shown). Furthermore, a portion of the data message may be time-stamped. For example, the individual frames or even the individual octets may be time-stamped. In another example, a time delay between the communication of messages may be determined using a time stamp of the data message.

In such an arrangement, protocol identifier module may be adapted to identify the protocol based on a time-stamp associated therewith. This time-stamp may facilitate the distinguishing between different messaging protocols. Various protocols have a timing element associated with its arrangement or sequence (e.g., a period of dead time wherein either message data is not transmitted or there is no data within the message data). A timer and time-stamp, as described above, may be used to determine this timing element.

The present invention embodiments may be adapted to evaluate messaging protocol including the timing element within its sequence. If the timing element is in accordance with the select messaging protocol, the message is transmitted to the claim control module as described above. If the timing element is not in accordance with the select messaging protocol, the protocol identifier module is adapted to signal the next protocol identifier module to evaluate the message.

In yet another embodiment, it is contemplated that each of these protocol identifier modules 22a, 22b . . . 22n may be used to identify the protocol of the messages concurrently. As described above, message data in data buffer 20 are accessible to each of the protocol identifier modules 22a, 22b . . . 22n. Accordingly, each of the protocol identifier modules 22b . . . 22n may be adapted such that it does not need a signal from another protocol identifier module in order to begin the identification process.

Referring back to FIGS. 2 and 3, after the messaging protocols are identified by protocol identifier modules 22a, 22b . . . 22n, messages are transmitted to claim control module 24 for further processing. The claim control module 24 provides data to the associated IED in order to identify or otherwise label the protocol of the message transmitted thereto.

For example, as shown herein, Claim_som as shown in FIG. 2 may be used to signify the first section of the portion of the message that has been claimed (e.g., the first octet of the portion of the message). Claim_eom may be used to signify the last section of the portion of the message that has been claimed (e.g., the last octet of the portion of the message). Claim_to_eom may be used to signify the end of a claimed portion of the message due to a time delay (based on an associated time stamp) during which portions of the claimed message are not received. Claim_owner may be used to signify the protocol of the identified frame.

In yet another embodiment, the present invention embodiments of FIGS. 1 and 2 may further be adapted to determine whether to communicate a message to the associated network device. For example, it may be desirable for SCADA server 6 to send messages using various different protocols to each of the IEDs 8a, 8b or 8n. For example, it may be desirable for SCADA server 6 to send DNP protocol and MODBUS protocol messages to IED 8a. It may be desirable for SCADA server 6 to send only DNP protocol messages to IED 8b. It may be desirable for SCADA server 6 to send only MODBUS protocol messages to IED 8n. In another example, it may be desirable for SCADA server 6 to send some messages using an encrypted protocol, whereas others messages are not encrypted. For example, it may by desirable for SCADA server 6 to send messages using an encryption protocol to IED 8a.

Accordingly, based on whether the protocol identifier modules "like", "dislike" or otherwise "claim" the message, the protocol evaluation apparatuses may serve as filters for messages communicated or not communicated to the associated network device. For example, protocol evaluation apparatuses 10a, 10b . . . 10n may be adapted to transmit any messages that are "claimed" or "liked" to the associated IEDs 8a, 8b . . . 8n respectively, whereas any messages that are "disliked" are not transmitted to the respective IED 8a, 8b . . . 8n. In this way, the proper messages via the protocols associated therewith are analyzed and filtered such that they may be properly transmitted to the appropriate network device.

It is important to note that the present invention is adapted to accommodate a number of different protocols, some of which have specific character sequences, timing elements or a combination thereof. For the electric power system industry, such protocols include, but are not limited to, HAYES, SMI, DNP, AGA, SEL, DDF, UPP, MODBUS, IEC-60870, IEC-61850, PROFIBUS and other similar protocols. Examples of implementation of some of the protocols which may be used in accordance with the present invention system and device are described below.

EXAMPLE 1

HAYES and SMI Messaging Protocols

As illustrated in FIGS. 4 and 5, the sequences of a HAYES (a modem messaging protocol architecture) and Secure Mode Initialization (SMI) messaging protocol includes three messaging characters situated between two timing elements. These two timing elements are a period of dead time wherein message data is not transmitted. Accordingly, these timing elements may be generally referred to as "Deadtime".

For the HAYES messaging protocol, the first timing element 40 is defined by the amount of time the protocol evaluation apparatus is idle after receiving the last frame of data. The protocol then includes three HAYES characters 42. The second timing element 44 is defined by the amount of time after the last octet of the last frame of data has been received. The two timing elements 40, 44 are further each defined by Deadtime seconds specific to the HAYES messaging protocol.

For the SMI messaging protocol, the first timing element 50 is defined by the amount of time the protocol evaluation apparatus is idle after receiving the last frame of data. The protocol then includes three SMI characters 52. The second timing element 54 is defined by the amount of time after the last octet of the last frame of data has been received. The two timing elements 50, 54 are each further defined by Deadtime seconds specific to the SMI messaging protocol.

The present invention embodiments may be adapted to evaluate either a HAYES or SMI messaging protocol. More specifically, the timing elements may be determined by the time stamp as described above. Moreover, the sequence of the messaging protocol may be determined by associating the HAYES or SMI protocol with a protocol identifier module.

If each timing element and frame is in accordance with the HAYES or SMI protocol, the message is transmitted to the claim control module as described above. If any of the timing elements or frames is not in accordance with the HAYES or SMI protocol, the protocol identifier module is adapted to signal the next protocol identifier module to evaluate the message.

In the claim control module, Claim_som as shown may be used to signify the first octet of the frame that has been claimed. Claim_eom may be used to signify the last octet of the frame that has been claimed. Claim_to_eom may be used to signify the end of a claimed frame due to an appropriate dead time (based on an associated time stamp). Claim_owner may be used to signify the protocol of the identified frame.

In another embodiment, the proper HAYES or SMI messages via their specific protocols associated therewith are analyzed and filtered such that they may be properly transmitted to the appropriate IED.

EXAMPLE 2

DNP Messaging Protocol

As illustrated in FIG. 6, the sequence of a DNP messaging protocol includes the following portions: a beginning identifier 60 of the messaging protocol, the length 61 of the message, control portion 62 for identifying the function of the message, destination 63 of the message, source 64 of the message, cyclic redundancy check (CRC) 65, and the data 66.

The present invention embodiments may be adapted to evaluate the DNP messaging protocol. More specifically, the sequence of the messaging protocol may be determined by associating the DNP protocol with a protocol identifier module. Since the beginning identifier 60 provides for an identification means for the message, a protocol identifier module of the present invention may be adapted to analyze only this portion of the message.

For example, if the beginning identifier 60 is in accordance with a typical DNP protocol (e.g., containing 0x0564), the message is transmitted to the claim control module as described above. If any of the beginning identifier 60 is not in accordance with the DNP protocol, the protocol identifier module is adapted to signal the next protocol identifier module to evaluate the message.

In the claim control module, Claim_som as shown may be used to signify the first octet of the frame that has been claimed. Claim_eom may be used to signify the last octet of the frame that has been claimed. Claim_to_eom may be used to signify the end of a claimed frame due to an appropriate dead time (based on an associated time stamp). Claim_owner may be used to signify the protocol of the identified frame.

In another embodiment, proper DNP messages via the specific DNP protocol associated therewith are analyzed and filtered such that they may be properly transmitted to the appropriate IED.

Figure 7:
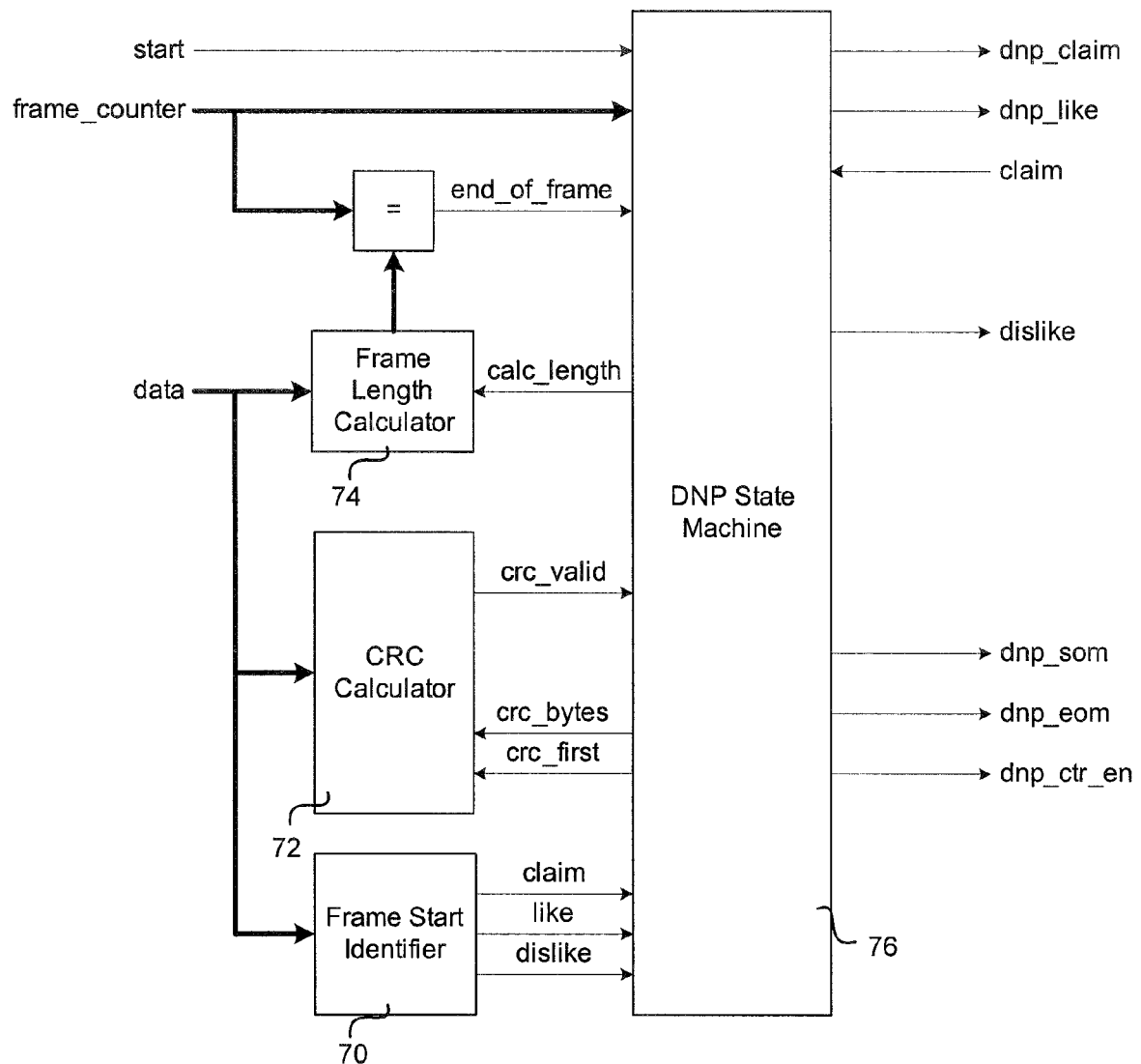
FIG. 7 is a functional block diagram of a protocol evaluation apparatus for evaluating a DNP messaging protocol according to an embodiment of the present invention system.

The present invention may further be adapted to evaluate the remainder of the message as shown in FIG. 7. In this arrangement, provided is a frame start identifier 70, a cyclic redundancy check (CRC) calculator 72, a frame length calculator 74 and a DNP State Machine 76.

The frame start identifier 70 functions like the protocol identifier module of FIG. 2. More specifically, the frame start identifier 70 monitors the data buffer (not shown) to determine whether the beginning identifier portion of the message is in accordance with a typical DNP protocol (e.g., containing 0x0564) as described above. If it is, the message is transmitted to the claim control module as described above. If not, the frame start identifier 70 is adapted to signal another next protocol identifier module or frame start identifier (not shown) to evaluate the message.

A CRC calculator 72 may be provided in order to detect errors in the message. A frame length calculator 74 may further be provided to determine the overall length of the frame. The DNP State Machine 76 may function like the claim control module except with the added functionality of processing the data from CRC calculator 72 and frame length calculator 74.

EXAMPLE 3

AGA and SEL Messaging Protocols

As illustrated in FIGS. 8 and 9, the sequences of an AGA and SEL messaging protocol include messaging protocol signifiers before and after the data.

For the AGA messaging protocol, the first messaging protocol identifier is a 2-octet data delimiter (AGA_ESC AGA_SOM) 80. The next portion is data 82. The second messaging protocol identifier is also a 2-octet data delimiter (AGA_ESC AGA_EOM) 84.

For the SEL messaging protocol, the first messaging protocol identifier is a 1-octet data delimiter (SEL_SOM) 90. The next portion is data 92. The second messaging protocol identifier for the SEL messaging protocol is also a 1-octet data delimiter (SEL_EOM) 94.

The present invention embodiments as described with respect to FIGS. 1 and 2 may be adapted to evaluate either an AGA or SEL messaging protocol. More specifically, the sequence of the messaging protocol may be determined by associating the AGA or SEL protocol with a protocol identifier module.

If the first and second messaging protocol identifier is in accordance with the AGA or SEL protocol, the message is transmitted to the claim control module as described above. If any of the frames of either the first or second messaging protocol identifier is not in accordance with the AGA or SEL protocol, the protocol identifier module is adapted to signal the next protocol identifier module to evaluate the message.

In another embodiment, the proper AGA or SEL messages via their specific protocols associated therewith are analyzed and filtered such that they may be properly transmitted to the appropriate IED.

EXAMPLE 4

DDF and UPP Messaging Protocols

Delay Delimited Format (DDF) messaging protocols are associated with a specific time element. Using the timer as described above, the timing element is a period of dead time wherein either message data is either not transmitted or there is no data within the message data.

The present invention embodiments may be adapted to evaluate a DDF messaging protocol. More specifically, the timing elements may be determined by the time stamp as described above. If each timing element is in accordance with the DDF protocol, the message is transmitted to the claim control module as described above. If the timing element is not in accordance with the DDF protocol, the protocol identifier module is adapted to signal the next protocol identifier module to evaluate the message.

In another embodiment, the proper DDF messages via the specific timing elements associated therewith are analyzed and filtered such that they may be properly transmitted to the appropriate IED.

EXAMPLE 5

Unstructured Messaging Protocols

Unstructured messaging protocols do not have a specific sequence associated therewith. Unstructured messaging protocols are sometimes referred to as Unstructured Point to Point (UPP) messaging protocols. Accordingly, such messaging protocols may be defined by a timing element like the DDF messaging protocol as discussed above or otherwise the maximum number of characters in the message. As such, if the unstructured messaging protocol is based on a specific maximum number of characters, a protocol identifier module may be adapted to determine the number of characters associated with the specific unstructured messaging protocol. If the number of characters is in accordance with the particular unstructured messaging protocol, the message is transmitted to the claim control module as described above. If the number of characters is not in accordance with the particular unstructured messaging protocol, the protocol identifier module is adapted to signal the next protocol identifier module to evaluate the message.

Figure 10:
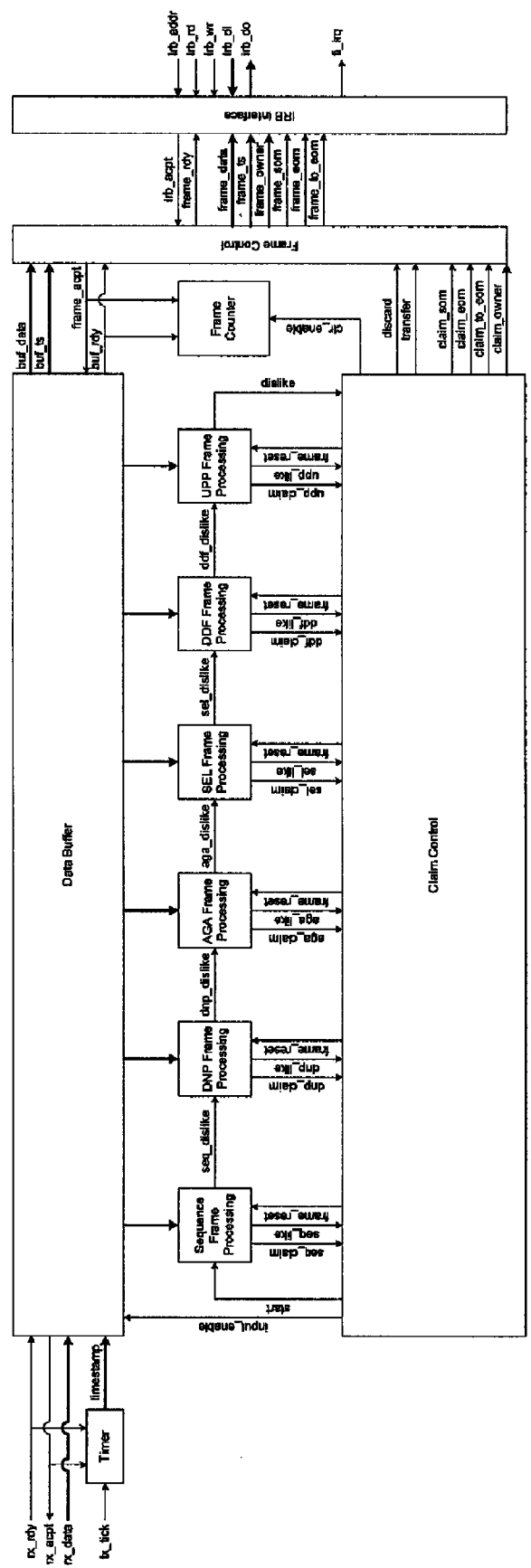
FIG. 10 is a functional block diagram of a protocol evaluation apparatus for evaluating HAYES or SMI; DNP; AGA; SEL; DDF; and UPP messaging protocols.

In accordance with the teachings of the present invention and examples 1-4 described herein, it is to be noted that any of the above examples may be implemented into a system for evaluating HAYES, SMI, DNP, AGA, SEL, DDF, and/or UPP messaging protocols, individually or in any combination thereof. An example of a system for analyzing all of these protocols in one system is illustrated in FIG. 10.

While this invention has been described with reference to certain illustrative aspects, it will be understood that this description shall not be construed in a limiting sense. Rather, various changes and modifications can be made to the illustrative embodiments without departing from the true spirit, central characteristics and scope of the invention, including those combinations of features that are individually disclosed or claimed herein. Furthermore, it will be appreciated that any such changes and modifications will be recognized by those skilled in the art as an equivalent to one or more elements of the following claims, and shall be covered by such claims to the fullest extent permitted by law.

What is claimed is:

1. A system for evaluating a message on a single network, said network including a plurality of network devices communicating messages using various different protocols, wherein a portion of each message includes a specific sequence, the system comprising:

a plurality of network devices; and a protocol evaluation apparatus coupled to one of the network devices, said protocol evaluation apparatus including a first protocol identifier module associated with a specific messaging protocol, a second protocol identifier module associated with another specific messaging protocol and a claim control module, said first protocol identifier module configured to evaluate the sequence of a portion of a message on the network, wherein the first protocol identifier module transmits the message to the claim control module if the sequence of the portion of the message on the network is in accordance with the specific messaging protocol associated with the first protocol identifier module, and wherein the first protocol identifier module signals the second protocol identifier module to evaluate the message if the sequence of the portion of the message on the network is not in accordance with the specific messaging protocol of the first protocol identifier module, said second protocol identifier module configured to evaluate the sequence of a portion of the message if signaled by the first protocol identifier module, wherein the second protocol identifier module transmits the portion of the message to the claim control module if the sequence of the portion of the message on the network is in accordance with the specific messaging protocol associated with the second protocol identifier module, said claim control module configured to claim the portions of the message transmitted by either the first protocol identifier module or the second protocol identifier module and transmit the claimed portions of the message to the network device of the associated protocol coupled to the protocol evaluation apparatus.

2. The system of claim 1, wherein the portion of the message is at least an octet of data.

3. The system of claim 1, wherein each protocol identifier module evaluates the portion of the message on a frame-by-frame basis.

4. The system of claim 1, wherein the protocol evaluation apparatus further includes a data buffer for storing portions of messages to be evaluated.

5. The system of claim 1, wherein the protocol evaluation apparatus further includes a timer.

6. The system of claim 5, wherein the portion of the message includes a time element associated with the sequence associated therewith, and wherein said protocol evaluation apparatus transmits the message to the network device if the sequence of the portion of the message including the time element is in accordance with the specific messaging protocol associated with either the first or second protocol identifier module.

7. The system of claim 6, wherein said claim control module is configured to transmit the end of a claimed portion of the message due to a time delay during which portions of the claimed message are not received.

8. The system of claim 1, wherein the specific messaging protocol is associated with a specific encryption protocol.

9. The system of claim 1, wherein the specific messaging protocol is associated with a messaging protocol used in an electric power system.

10. The system of claim 9, wherein the specific messaging protocol is selected from the group consisting of HAYES, SMI, DNP, AGA, SEL, DDF, MODBUS, IEC-61850, PROFIBUS, and unstructured messaging protocols .

11. The system of claim 1, wherein the network is selected from a group consisting of a local area network, a wide area network, and a SCADA system.

12. The system of claim 1, wherein the protocol evaluation apparatus is part of the network device.

13. The apparatus of claim 1, wherein the specific messaging protocol associated with the first protocol identifier is more complex than the specific messaging protocol associated with the second protocol identifier.

14. The apparatus of claim 1, wherein the specific messaging protocol associated with the first protocol identifier has higher priority than the specific messaging protocol associated with the second protocol identifier.

15. The system of claim 1, wherein the message is evaluated by each protocol identifier module until a portion of the message is claimed by the claim control module.

16. An apparatus for evaluating a message on a single network, said network including a plurality of devices communicating messages using various different protocols, wherein a portion of each message includes a specific sequence, the apparatus associated with one of the network devices and comprising:

a first protocol identifier module associated with a specific messaging protocol, a second protocol identifier module associated with another specific messaging protocol, and a claim control module;

said first protocol identifier module associated with a specific messaging protocol, said first protocol identifier module configured to evaluate the sequence of a portion of a message on the network, wherein the first protocol identifier module transmits the portion of the message to the claim control module if the sequence of the portion of the message on the network is in accordance with the specific messaging protocol associated with the first protocol identifier module, and wherein the first protocol identifier module signals the second protocol identifier module to evaluate the message if the sequence of the portion of the message on the network is not in accordance with the specific messaging protocol of the first protocol identifier module;

said second protocol identifier module configured to evaluate the sequence of a portion of the message if signaled by the first protocol identifier module, wherein the second protocol identifier module transmits the portion of the message to the claim control module if the sequence of the portion of the message on the network is in accordance with the specific messaging protocol associated with the second protocol identifier module, and said claim control module configured to claim the messages transmitted by either the first protocol identifier module or the second protocol identifier module and transmit the claimed portions of messages to the network device of the associated protocol.

17. The apparatus of claim 16, wherein the specific messaging protocol associated with the first protocol identifier is more complex than the specific messaging protocol associated with the second protocol identifier.

18. The apparatus of claim 16, wherein the specific messaging protocol associated with the first protocol identifier has higher priority than the specific messaging protocol associated with the second protocol identifier.

19. The apparatus of claim 16, wherein the portion of the message is at least an octet of data.

20. The apparatus of claim 16, wherein each protocol identifier module evaluates the portion of the message on a frame-by-frame basis.

21. The apparatus of claim 16, further comprising a data buffer for storing a number of messages to be evaluated.

22. The apparatus of claim 16, further comprising a timer.

23. The apparatus of claim 22, wherein the portion of the message includes a time element associated with the sequence associated therewith.

24. The apparatus of claim 23, said claim control module further configured to transmit the end of a claimed portion of the message due to a time delay during which portions of the claimed message are not received.

25. The apparatus of claim 16, wherein one of the specific messaging protocols is associated with a specific encryption protocol.

26. The apparatus of claim 16, wherein the specific messaging protocols are associated with a messaging protocol used in an electric power system.

27. The apparatus of claim 16, wherein the specific messaging protocols are selected from the group consisting of HAYES, SMI, DNP, AGA, SEL, DDF, MODBUS, IEC-61850, PROFIBUS, and unstructured messaging protocols.

28. The apparatus of claim 16, wherein the network is selected from a group consisting of a local area network, a wide area network, and a SCADA system.

29. The apparatus of claim 16, wherein the evaluation apparatus is part of the network device.

30. The system of claim 16, wherein the message is evaluated by each protocol identifier module until a portion of the message is claimed by the claim control module.

* * * * *